US012800362B2

(12) United States Patent
Staiger et al.

(10) Patent No.: US 12,800,362 B2
(45) Date of Patent: Nov. 17, 2026

(54) FILL LEVEL MEASURING DEVICE WITH ADJUSTABLE ACTIVATION

(71) Applicant: VEGA Grieshaber KG, Wolfach (DE)

(72) Inventors: Holger Staiger, Hardt (DE); Patrick Moser, Seelbach (DE); Jonas Schwab, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 603 days.

(21) Appl. No.: 18/040,835

(22) PCT Filed: Aug. 13, 2020

(86) PCT No.: PCT/EP2020/072776

§ 371 (c)(1),
(2) Date: Feb. 7, 2023

(87) PCT Pub. No.: WO2022/033692

PCT Pub. Date: Feb. 17, 2022

(65) Prior Publication Data

US 2023/0266153 A1 Aug. 24, 2023

(51) Int. Cl.
*G01D 21/02* (2006.01)
*G01F 15/00* (2006.01)
*G01F 23/00* (2022.01)

(52) U.S. Cl.
CPC .................................... *G01D 21/02* (2013.01)

(58) Field of Classification Search
CPC ...... G01F 23/2966; G01F 1/00; G01F 1/3227; G01F 1/74; G01F 1/86; G01F 15/08;
(Continued)

(56) References Cited

U.S. PATENT DOCUMENTS 8,970,395 B2 3/2015 Nilsson et al.
8,984,533 B2 * 3/2015 Bezdicek ........... G05B 19/4185 719/314

(Continued)

FOREIGN PATENT DOCUMENTS

CN 112733380 A * 4/2021 ........... G06F 16/284
CN 120596067 A * 9/2025 ........... G06F 9/4498

(Continued)

OTHER PUBLICATIONS

European Office Action issued Jan. 23, 2025 in European Patent Application No. 20 757 290.0, 6 pgs.

(Continued)

*Primary Examiner* — Andre J Allen
(74) *Attorney, Agent, or Firm* — Oblon, McClelland, Maier & Neustadt, L.L.P.

(57) ABSTRACT

A measuring device is provided for fill level measurement, for limit level determination, for pressure measurement, and/or for temperature measurement, the measuring device including: an energy source; at least one controllable switch; an activation device, which is directly connected to the energy source, including a programmable finite state machine, and which is configured to control the at least one controllable switch by the programmable finite state machine; and at least one load connected to the energy source via the at least one controllable switch.

11 Claims, 2 Drawing Sheets

(58) Field of Classification Search

CPC ...... G01F 23/00; G01F 23/007; G01F 23/244; G01F 23/284; G01F 23/2962; G01F 23/2967; G01F 15/06; G01F 23/80; G01F 23/804; G01F 25/10; G01F 25/00; G01F 25/24; G01F 23/0007; G01D 21/00; G01D 21/02; G01D 18/00; G01D 2218/10; G01D 3/08; G01N 2291/02836; G01N 2291/02872; G01N 2291/02881; G01N 2291/02809; G01R 31/318555; G05B 19/0423; G05B 19/0426; G05B 19/054; G05B 2219/14055; G05B 2219/15117; G05B 2219/23316; G05B 2219/25279; G05B 2219/25428; G05B 19/4185; G06F 1/3278; G06F 1/3203; G06F 1/325; G06F 1/3265; G08C 15/06; H04B 1/38; H04Q 2209/883; H04Q 9/00; H04W 52/0261; H04W 52/0293; H04W 52/386

See application file for complete search history.

(56) References Cited

U.S. PATENT DOCUMENTS

| | | | | |
|---|---|---|---|---|
| 2010/0298999 | A1 | 11/2010 | Allgaier et al. | |
| 2015/0039924 | A1 | 2/2015 | Allgaier et al. | |
| 2015/0096385 | A1 | 4/2015 | Downie et al. | |
| 2017/0293345 | A1* | 10/2017 | Cooper | G06F 1/3206 |
| 2018/0031687 | A1 | 2/2018 | Mueller et al. | |
| 2018/0321952 | A1* | 11/2018 | Rougier | G05B 19/0426 |
| 2019/0086944 | A1* | 3/2019 | Mueller | G05B 21/02 |
| 2019/0243315 | A1* | 8/2019 | Itaya | G06Q 50/04 |
| 2020/0025600 | A1 | 1/2020 | Waelde et al. | |
| 2020/0394337 | A1* | 12/2020 | Marinet | G11C 29/38 |
| 2021/0088365 | A1* | 3/2021 | Louwagie | G01B 7/18 |
| 2021/0349519 | A1* | 11/2021 | Aqrabawi | G06N 20/00 |
| 2022/0397661 | A1* | 12/2022 | Vook | G01S 13/931 |

FOREIGN PATENT DOCUMENTS

| | | | | | |
|---|---|---|---|---|---|
| EP | 2 667 162 | A1 | | 11/2013 | |
| EP | 2 829 929 | A1 | | 1/2015 | |
| EP | 2 667 162 | B1 | | 9/2015 | |
| EP | 3 279 619 | A1 | | 2/2018 | |
| EP | 2 829 929 | B1 | | 10/2019 | |
| EP | 3 598 078 | A1 | | 1/2020 | |
| EP | 3 598 079 | A1 | | 1/2020 | |
| GB | 2 271 691 | A | | 4/1994 | |
| JP | 2015507255 | A | * | 3/2015 | G06N 3/08 |
| JP | 6207605 | B2 | * | 10/2017 | G06F 9/4498 |

OTHER PUBLICATIONS

International Search Report issued May 10, 2021 in PCT/EP2020/072776, filed on Aug. 13, 2020, 3 pages.

International Preliminary Report on Patentabiiity and Written Opinion issued Feb. 23, 2023, in PCT/EP2020/072776, 7 pages.

Office Action dated Feb. 11, 2026, issued in corresponding Chinese patent application No. 202080102927.X.

* cited by examiner

FILL LEVEL MEASURING DEVICE WITH ADJUSTABLE ACTIVATION

FIELD OF INVENTION

The invention relates to a measuring device, e.g. a field device, with a sensor for fill level measurement. In particular, the invention relates to a measuring device with an activation unit, and to a use.

BACKGROUND

For fill level measurement, limit level determination, flow measurement, pressure measurement and/or temperature measurement, measuring devices, e.g. field devices and/or measuring systems, are used in many cases that can be disconnected from a power supply for a long time and depend on their own energy source. Therefore, in many cases it can be advantageous for this to last as long as possible.

SUMMARY

It is an object of the invention to provide a measure for at least partially reducing the power consumption of a energy source of a measuring device.

This object is solved by the subject-matter of the independent patent claims. Further embodiments of the invention result from the subclaims and the following description.

One aspect relates to a measuring device for fill level measurement, topology determination, limit level determination, flow measurement, pressure measurement, and/or temperature measurement. The measuring device comprises an energy source and at least one controllable switch. Further, it comprises an activation unit directly connected to the energy source, comprising a programmable finite automaton and adapted to control the controllable switch by means of the finite automaton. Further, it comprises at least one load connected to the energy source via the at least one controllable switch.

The energy source may be, for example, a cell, a battery, an accumulator, a special form such as a solar module, a fuel cell, or a so-called "energy harvesting" energy source, and/or a combination of various embodiments. The controllable switch or switches may be, for example, mechanical switches, such as a relay, or semiconductor switches, such as a MOSFET. A controllable switch may switch one or more components or devices on, off, or over.

The activation unit is directly connected to the energy source so that at least parts of the activation unit are always powered. The activation unit comprises a programmable finite state machine (FSM), such as one or more hardware devices like a field programmable gate array (FPGA), a programmable array logic (PAL) and/or other hardware. Alternatively or additionally, the activation unit may be implemented as software or as firmware, such as a jump table and/or a switch/case instruction, and may be implemented, for example, as part of a processor. At least some processors and/or other devices (e.g. FPGAs) may have parts of their hardware implemented in a way that can be switched off or deactivated. The automata may be programmable once or multiple times. At least some states of the automaton may act on the controllable switch, i.e., switch the switch—or multiple switches—on, off, or over. By means of the one or more controllable switches, at least one load, i.e. consumer, can be switched, which is connected to the energy source via the at least one controllable switch. For example, a load may be the sensor of the measuring device, and may include, for example, an impedance limit switch, a vibration limit switch, a radio frequency front end, ultrasonic front end, LiDAR front end, or laser front end. Alternatively or additionally, the load may be designed as a display device, a control device, and/or another component of the meter. Likewise, a communication unit (wireless or wired) is a possible load, which can be connected to the energy source by the controllable switches. In addition, a display, signal elements or signal lights (e.g. LED), keys or other parts of, for example, a display and control unit can also be connected to the energy source.

This design allows at least some components—in some embodiments, even most components and/or the components with the highest power consumption—to be kept de-energized for extended periods of time. This can contribute to a significant reduction in the power consumption of the energy source of the meter. In addition, the finite state machine can provide a high degree of flexibility in power-up conditions. For example, a power-up sequence can be selected that protects against misoperation and/or unauthorized access. For example, if a "push button three times" sequence has been programmed, this can advantageously lead to a very good balance between functionality, flexibility and power consumption—with very low power consumption, because only a small vending machine or only a part of the vending machine needs to be powered. Thus a self-sufficient sensor (or measuring device) can be realized, which can be activated by different activation sources and can adjust the priority and the behavior of the activation sources flexibly and/or situation-dependently to the application.

In some embodiments, the finite state machine has at least one of the following devices as an input device: a pushbutton, a switch, a first time module (e.g., a real-time clock, RTC), a voltage monitor, a magnetic contact, and/or a sensor for light, heat, sound. Thereby, the voltage monitoring can be designed e.g. to detect an additional, voltage source, or register a falling below of the energy source of a predefined voltage. The magnetic contact can be e.g. a reed contact or a Hall sensor. For example, two types of input device can be provided: a first type that is permanently powered by the energy source of the measuring device (e.g., a clock), or a second type that has its own (such as a voltage monitor) or no voltage supply—(such as a pushbutton). Advantageously, this allows a large number of types of input devices to be used. The power supply to these types of input devices can be controlled by the vending machine to further reduce power requirements.

In some embodiments, the finite state machine is realized as one or more hardware elements, firmware, and/or software. The choice of realization may depend, for example, on the required flexibility, power consumption, and/or other factors.

In some embodiments, the finite state machine is programmable. For example, the automaton may be programmable once (e.g., PAL), or programmable multiple times (e.g., FPGA). Thus, the switching sequence can be individualized in wide ranges for each measuring device. Once programmable devices can be chosen e.g. for safety considerations. Multiple programmable devices can guarantee e.g. increased flexibility. In particular, the automatic system can be changed without having to leave the idle state of the level meter. Alternatively or additionally, the automat can be programmed or reprogrammed e.g. via the radio module.

In some embodiments, at least some states of the finite state machine have a mutable attribute. The mutable attribute may be implemented, for example, as an incrementable attribute, as a timestamp, and/or as some other attribute. For example, an incrementable attribute may be used to realize logging of the measuring device. This may be combined with, for example, a timestamp, a login identity, and/or other attributes. This can be used, for example, to store and/or analyze a reason for activating the measuring device.

In some embodiments, the finite state machine is readable. This can be used, for example, to read attributes of the states. It can also be used for checking—e.g. "what is programmed?"—and/or for maintenance purposes.

In some embodiments, the finite state machine is designed to be encrypted programmable and/or readable. This can be used, for example, to implement logging of the measuring device with increased security.

In some embodiments, the load comprises a level sensor, a control module, a second timing module, display elements, signal elements, and/or a radio module. The second timing module differs from the first timing module in that it is designed to be switchable, i.e., it may have higher power consumption and allows for greater complexity than the first timing module. For example, loads can be switched together or optionally selectively.

For example, selected events may provide only partial activation of the system. For example, the load may include a near field communication (NFC) chip that is only fully activated when the system is activated by NFC. Similarly, subsystems such as communication modules can be supplied with power even when the main system—e.g., the sensor—is idle.

In some embodiments, the measuring device further comprises a further time module configured to monitor the time module and/or the second time module. A further time module may be integrated in the vending machine for monitoring the first and/or second time module. By means of this time module, an activation of the system can be enabled, also, for example, in case of a failure of the first time module. Such systems are sometimes referred to as "RTC watchdogs". The mentioned functionality can also be part of the first or second time module In some embodiments, the finite state machine implements a positive or negative timing offset to activate at least one of the controllable switches in a delayed manner and/or at a different time than another one of the controllable switches.

A positive temporal offset can be achieved, for example, by a chain of states and/or by iteratively cycling through a particular state. A negative temporal offset can be achieved, for example, by a positive temporal offset of the other controllable switches. Advantageously, this can provide temporal variability in the activation of the system or subsystems—i.e., relatively earlier or later activation. The temporal offset is sometimes referred to as "time jitter." This feature of the automaton can advantageously prevent simultaneous activation of multiple identically or similarly set or configured devices.

One aspect relates to a use of a measuring device as described above and/or below for level measurement, for level limit determination, for pressure measurement and/or for temperature measurement.

For further clarification, aspects of the present disclosure are described with reference to embodiments illustrated in the figures. These embodiments are to be understood as examples only, and not as limitations.

BRIEF DESCRIPTION OF THE FIGURES

Thereby shows.

DETAILED DESCRIPTION OF EMBODIMENTS

Figure 1:
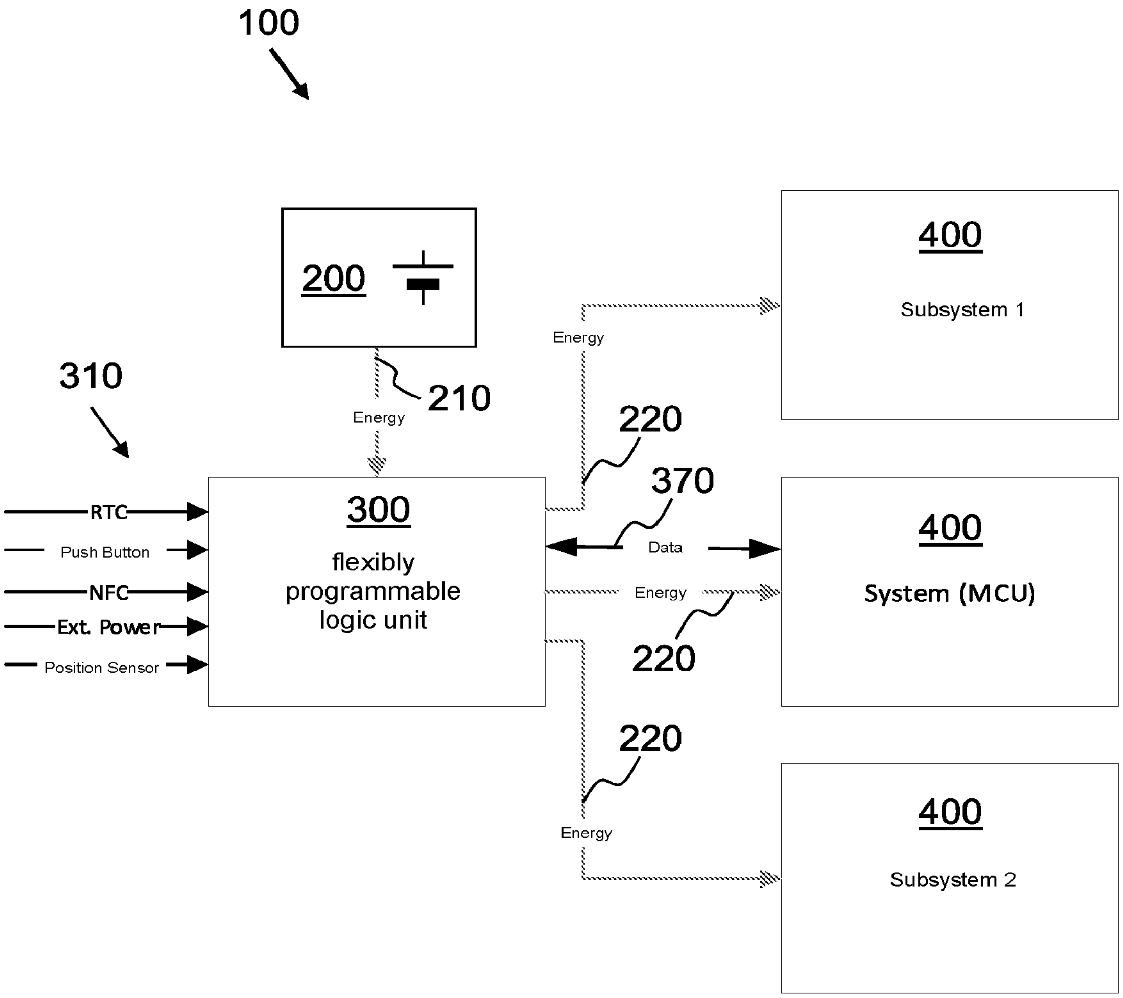
FIG. 1 a schematic of a measuring device according to an embodiment.

FIG. 1 schematically shows a measuring device 100, which may be set up or suitable, for example, for fill level measurement, for limit level determination, for pressure measurement and/or for temperature measurement. The measuring device 100 may have several subsystems, the power supply of which may be controlled by a flexibly programmable logic unit or activation unit 300, which may include, for example, a programmable finite state machine. Furthermore, a data link 370 may still be implemented between the main system (MCU, MicroController Unit) and the programmable logic unit, which may be used, for example, for programming, for reprogramming and/or for reading out the logic unit 300. The logic unit 300 is directly connected to the energy source 200, and is continuously powered. The logic unit 300 may be connected to input devices (not shown) via an input interface 310 in series and/or in parallel with the logic unit 300. For example, the input interface 310 may be configured to receive data from an RTC (Real Time Clock), a push button, an NFC module, an external power supply, a position sensor, and other input devices.

Figure 2:
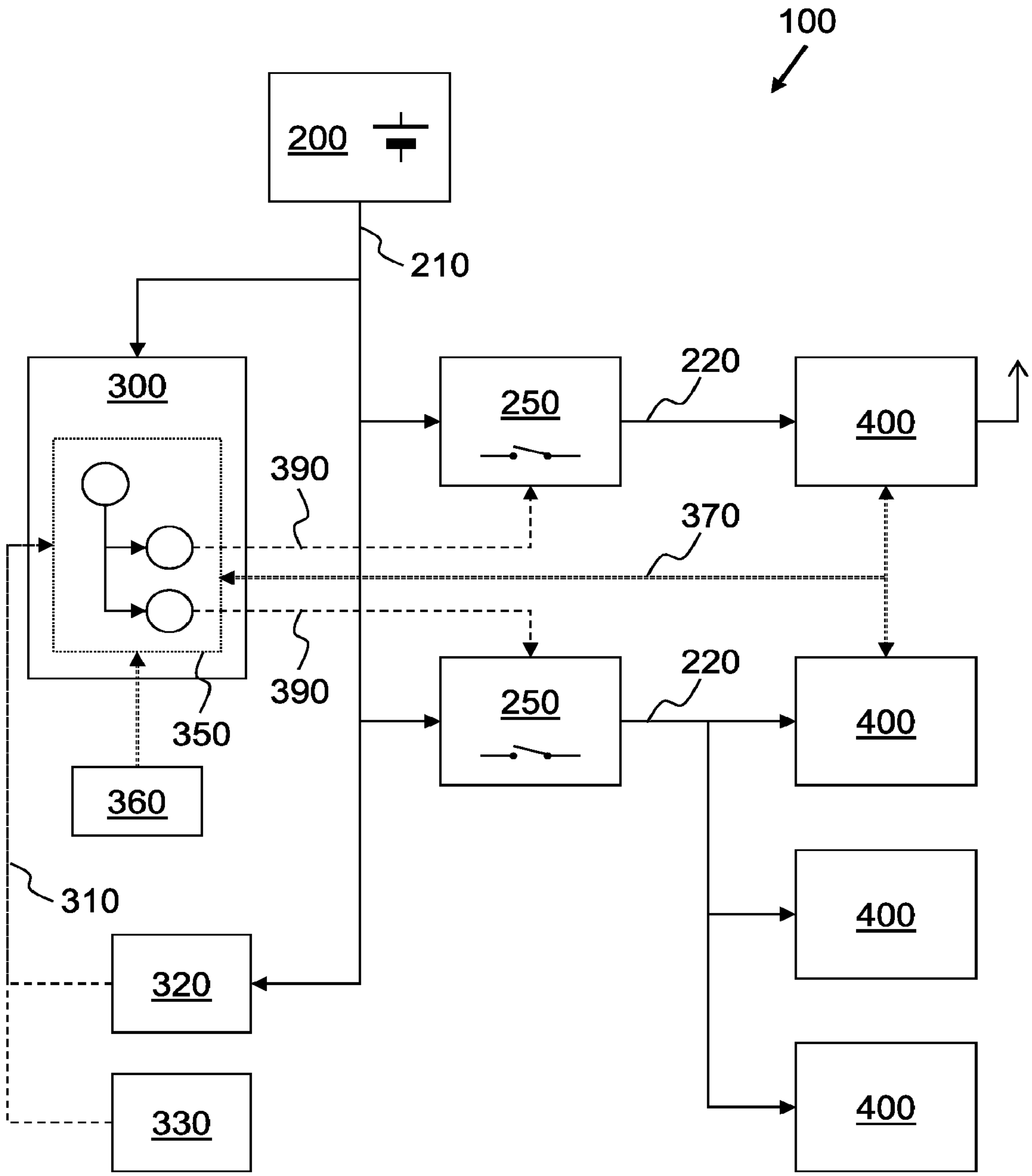
FIG. 2 a schematic of a measuring device according to a further embodiment.

FIG. 2 schematically shows another embodiment of a measuring device 100. The measuring device 100 may be designed, for example, as a field device, in particular as a self-sufficient field device. The measuring device 100 may have a single energy source 200, e.g., in the form of a cell, a battery, or an accumulator; however, it may also have additional energy sources (not shown), e.g., a solar module, a fuel cell, a so-called "energy harvesting" energy source, and/or a combination of different energy sources. In the embodiment shown, the energy source 200 is directly connected to a plurality of modules or components of the meter 100 via a line 210. For example, an activation unit 300 is directly connected to the energy source 200. Further, an input device—or class of input devices—320 is directly connected to the energy source 200. Components associated with this class of input devices 320 include, for example, a first Real-Time Clock (RTC) module configured to control certain actions of the activation unit 300.

The activation unit 300 is directly connected to the energy source 200, and is adapted to control one or more controllable switches 250 by means of the finite state machine 350, which as explained below may be programmable as dedicated states of a Mealy or Moore automaton. The one or more controllable switches 250 are connected to the energy source 200 via the line 210, and have a controlled line 220 at their output. One or more loads 400 may be arranged on each controlled line 220, such that the loads 400 are connected—individually or separately—to the energy source 200 via the at least one controllable switch 250. The load 400 may be a level sensor, a control module, a display and/or control element, a second timing module, display elements, signal elements, and/or a radio module.

The one or more switches 250 may be controlled by the finite state machine 350—or by dedicated states of the finite state machine 350—via control signals or control lines 390. The finite state machine 350 may be designed, for example, as a Mealy automaton or as a Moore automaton. The finite state machine 350 as input device 320, 330 comprise at least one of the following devices for example, a push button, a switch, a first timing module, a voltage monitor, a magnetic contact, a sensor for light, heat, sound, and/or other input devices. The input devices may include a class 320 of input devices that are continuously powered by the energy source and/or a class 320 of input devices that have their own power supply or do not require a power supply. The input devices 320, 330 are connected in series and/or parallel to the finite state machine 350 via an input interface 310. For example, the finite state machine 350 may have an interface 310 that allows the finite state machine 350 to be programmed by a module 360. Alternatively or additionally, the finite state machine 350 may be programmable and/or readable, for example, by other modules—for example, by the radio module and/or the control module—via a connection 370. This may, for example, allow the system to be primarily in an idle state, i.e., most or all of the loads 400 are turned off by means of the controllable switch or switches 250.

As a result, energy can be conserved, i.e., the load on the energy source 200 can be significantly reduced, because all components that are not needed are in a power-saving mode or are not powered at all. On the other hand, the flexibility of the finite state machine 350 allows a variety of activation and deactivation scenarios to be implemented, for example, satisfying a "machine scheme" such as "input pattern—sequence of internal states—output or output pattern". Examples of such scenarios can be:

- A time module (RTC) that can be flexibly set, e.g. fora period of time after which a specific switch 250 can be switched on, off or over.
- A monitoring of the time module (e.g., by means of a counter in the finite state machine 350), which can also be set flexibly and which activates the system, e.g., only if the time module has not functioned as desired.
- If an external power supply is connected in addition to the internal power supply 200, this can be signaled to the finite state machine 350 via the interface 310 by means of certain sensors.
- An NFC communication may be connected to the interface 310, and/or the NFC communication may be activated by means of a wake-up command (via push button, NFC telegram, etc.).
- The finite state machine 350 can also be activated, for example, by a magnet or a magnet field change (e.g., reed contact or Hall sensor).
- Mechanical activation (e.g. via pushbutton or switch) can be implemented.
- Activation can be realized by means of vibrations or position changes (e.g. acceleration or position sensor).
- A low battery level or state of charge of the rechargeable energy storage device 200 may be signaled and cause the vending machine to issue an alarm (e.g., LED).
- Analogously, a light sensor, heat sensor, sound sensor (e.g. clapping or commandos such as "Hey Vega"), for example, can be used as an activation.
- The time module activates the system cyclically at defined times, whereby a measured value is recorded and immediately sent by radio. Subsequently, the system goes back to the idle state.
- By pressing the button for a predefined period of time, e.g. more than 5 seconds, the system is activated and only acquires measured values, stores them, but does not transmit any data and deactivates again.
- The reed contact activates a Bluetooth module (as load 400) for a certain time. The system then returns to the idle state.
- A flexibly adjustable combination of pushbutton and reed contact activates the system and makes it accessible by means of the Bluetooth module or the NFC module.
- If the reed contact is triggered permanently and a connection with the NFC module is established at the same time, the level meter as well as the settings of the activation sources can be reconfigured, for example its measuring cycle, data transmission and/or further parameters.

LIST OF REFERENCE SIGNS

100 Fill level measuring device
200 Energy source
210 Line
220 Controlled line
250 Controllable switch
300 Activation unit
310 Input interface
320, 330 Input devices
350 Programmable finite state machine
360 Module
390 Control lines
400 Load

The invention claimed is:

1. A measuring device for fill level measurement, for limit level determination, for pressure measurement, and/or for temperature measurement, the measuring device comprising:
an energy source;
at least one controllable switch;
an activation unit,
which is directly connected to the energy source,
comprising a programmable finite state machine, the programmable finite state machine being programmable as dedicated states of a Mealy or Moore automaton, and
which is configured to switch on, off, or over the at least one controllable switch by means of at least some states of the programmable finite state machine; and
at least one load connected to the energy source via the at least one controllable switch.

2. The measuring device according to claim 1,
further comprising an input device,
wherein the programmable finite state machine comprises at least one of the following as the input device:
a pushbutton or a switch,
a first time module,
a voltage monitoring,
a magnetic contact, or
a sensor for light, heat, or sound.

3. The measuring device according to claim 1,
wherein the programmable finite state machine is a hardware element, firmware, and/or software.

4. The measuring device according to claim 1,
wherein at least some states of the programmable finite state machine have a mutable attribute.

5. The measuring device according to claim 1,
wherein the programmable finite state machine is readable.

6. The measuring device according to claim 1,
wherein the programmable finite state machine is configured to be programmable and/or readable in an encrypted manner.

7. The measuring device according to claim 1,
wherein the at least one load comprises a level sensor, a control module, a display and/or operating element, a second timing module, a display element, a signal element, and/or a radio module.

8. The measuring device according to claim 1,
wherein the programmable finite state machine comprises a first timing module and a second timing module, and
wherein the second timing module is configured to monitor the first timing module and/or the second timing module.

9. The measuring device according to claim 1,
wherein the programmable finite state machine realizes a positive or negative time offset to activate at least one of the controllable switches in a delayed manner and/or at a time other than another one of the controllable switches.

10. The measuring device according to claim 1, wherein the measuring device is configured to perform at least one of fill level measurement, topology determination, level limit determination, flow measurement, pressure measurement, and/or temperature measurement.

11. The measuring device according to claim 8,
further comprising a further time module configured to monitor the first timing module and/or the second timing module,
wherein the programmable finite state machine is configured to activate the measuring device upon detection of a failure of the monitored timing module.

* * * * *